United States Patent
Zhan et al.

(10) Patent No.: US 10,366,687 B2
(45) Date of Patent: Jul. 30, 2019

(54) SYSTEM AND METHODS FOR ADAPTING NEURAL NETWORK ACOUSTIC MODELS

(71) Applicant: Nuance Communications, Inc., Burlington, MA (US)

(72) Inventors: Puming Zhan, Acton, MA (US); Xinwei Li, Medford, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/965,637

(22) Filed: Dec. 10, 2015

(65) Prior Publication Data

US 2017/0169815 A1    Jun. 15, 2017

(51) Int. Cl.
*G10L 15/07* (2013.01)
*G10L 15/16* (2006.01)
*G10L 15/14* (2006.01)
*G10L 17/02* (2013.01)

(52) U.S. Cl.
CPC ............ *G10L 15/075* (2013.01); *G10L 15/07* (2013.01); *G10L 15/14* (2013.01); *G10L 15/16* (2013.01); *G10L 17/02* (2013.01)

(58) Field of Classification Search
CPC ................................ G10L 15/07; G10L 15/16
See application file for complete search history.

(56) References Cited

U.S. PATENT DOCUMENTS

| | | | | |
|---|---|---|---|---|
| 6,519,561 | B1 * | 2/2003 | Farrell | G10L 15/07 704/232 |
| 9,324,321 | B2 * | 4/2016 | Xue | G10L 15/075 |
| 2009/0216528 | A1 * | 8/2009 | Gemello | G10L 15/065 704/232 |
| 2014/0244257 | A1 * | 8/2014 | Colibro | G10L 17/06 704/246 |
| 2014/0257803 | A1 * | 9/2014 | Yu | G06N 3/0481 704/232 |
| 2015/0039299 | A1 * | 2/2015 | Weinstein | G10L 15/16 704/202 |

(Continued)

OTHER PUBLICATIONS

Omar, Fast Approximate I-Vector Estimation Using PCA, in Proc. ICASSP 2015.

(Continued)

*Primary Examiner* — Douglas Godbold
(74) *Attorney, Agent, or Firm* — Wolf, Greenfield & Sacks, P.C.

(57) ABSTRACT

Techniques for adapting a trained neural network acoustic model, comprising using at least one computer hardware processor to perform: generating initial speaker information values for a speaker; generating first speech content values from first speech data corresponding to a first utterance spoken by the speaker; processing the first speech content values and the initial speaker information values using the trained neural network acoustic model; recognizing, using automatic speech recognition, the first utterance based, at least in part on results of the processing; generating updated speaker information values using the first speech data and at least one of the initial speaker information values and/or information used to generate the initial speaker information values; and recognizing, based at least in part on the updated speaker information values, a second utterance spoken by the speaker.

14 Claims, 7 Drawing Sheets

(56) References Cited

U.S. PATENT DOCUMENTS

| | | | |
|---|---|---|---|
| 2015/0039301 A1* | 2/2015 | Senior | G10L 15/16 704/232 |
| 2015/0161995 A1* | 6/2015 | Sainath | G10L 15/16 704/232 |
| 2015/0371634 A1* | 12/2015 | Kim | G10L 15/07 704/233 |
| 2016/0260428 A1* | 9/2016 | Matsuda | G06N 3/08 |

OTHER PUBLICATIONS

Abrash et al., Connectionist Speaker Normalization and Adaptation, Proc. EUROSPEECH'95, 1995.

Gemello et al., Linear hidden transformations for adaptation of hybrid ANN/HMM Models, Speech Communication 49, No. 10, 2007.

Saon et al., Speaker Adaptation of Neural Network Acoustic Models Using I-Vectors, ASRU, pp. 55-59, 2013.

International Search Report and Written Opinion for International Application No. PCT/US2016/061326 dated Feb. 21, 2017.

Senior et al., Improving DNN speaker independence with I-vector inputs. 2014 IEEE International Conference on Acoustics, Speech and Signal Processing (ICASSP), IEEE. 2014;225-9.

International Preliminary Report on Patentability for International Application No. PCT/US2016/061326 dated Jun. 21, 2018.

* cited by examiner

SYSTEM AND METHODS FOR ADAPTING NEURAL NETWORK ACOUSTIC MODELS

BACKGROUND

Automatic speech recognition (ASR) systems are utilized in a variety of applications to automatically recognize the content of speech, and typically, to provide a textual representation of the recognized speech content. ASR systems typically utilize one or more statistical models (e.g., acoustic models, language models, etc.) that are trained using a corpus of training data. For example, speech training data obtained from multiple speakers may be utilized to train one or more acoustic models. Via training, an acoustic model "learns" acoustic characteristics of the training data utilized so as to be able to accurately identify sequences of speech units in speech data received when the trained ASR system is subsequently deployed. To achieve adequate training, relatively large amounts of training data are generally needed.

Acoustic models are implemented using a variety of techniques. For example, an acoustic model may be implemented using a generative statistical model such as, for example, a Gaussian mixture model (GMM). As another example, an acoustic model may be implemented using a discriminative model such as, for example, a neural network having an input layer, an output layer, and one or multiple hidden layers between the input and output layers. A neural network having multiple hidden layers (i.e., two or more hidden layers) between its input and output layers is referred to herein as a "deep" neural network.

A speaker-independent acoustic model may be trained using speech training data obtained from multiple speakers and, as such, may not be tailored to recognizing the acoustic characteristics of speech of any one speaker. To improve speech recognition performance on speech produced by a speaker, however, a speaker-independent acoustic model may be adapted to the speaker prior to recognition by using speech data obtained from the speaker. For example, a speaker-independent GMM acoustic model may be adapted to a speaker by adjusting the values of the GMM parameters based, at least in part, on speech data obtained from the speaker. The manner in which the values of the GMM parameters is adjusted during adaptation may be determined using techniques such as maximum likelihood linear regression (MLLR) adaptation, constrained MLLR (CMLLR) adaptation, and maximum-a-posteriori (MAP) adaptation.

The data used for adapting an acoustic model to a speaker is referred to herein as "enrollment data." Enrollment data may include speech data obtained from the speaker, for example, by recording the speaker speak one or more utterances in a text. Enrollment data may also include information indicating the content of the speech data such as, for example, the text of the utterance(s) spoken by the speaker and/or a sequence of hidden Markov model output states corresponding to the content of the spoken utterances.

SUMMARY

Some embodiments provide for a method for adapting a trained neural network acoustic model using enrollment data comprising speech data corresponding to a plurality of utterances spoken by a speaker. The method comprises using at least one computer hardware processor to perform: adapting the trained neural network acoustic model to the speaker to obtain an adapted neural network acoustic model, the adapting comprising: augmenting the trained neural network acoustic model with parameters representing a linear transformation to be applied to a subset of inputs to the adapted neural network acoustic model, the subset of inputs including speaker information values input to the adapted neural network acoustic model; and estimating, using the enrollment data, values of the parameters representing the linear transformation.

Some embodiments provide for at least one non-transitory computer-readable storage medium storing processor-executable instructions that, when executed by at least one computer hardware processor, causes the at least one computer hardware processor to perform a method for adapting a trained neural network acoustic model using enrollment data comprising speech data corresponding to a plurality of utterances spoken by a speaker. The method comprises adapting the trained neural network acoustic model to the speaker to obtain an adapted neural network acoustic model, the adapting comprising: augmenting the trained neural network acoustic model with parameters representing a linear transformation to be applied to a subset of inputs to the adapted neural network acoustic model, the subset of inputs including speaker information values input to the adapted neural network acoustic model; and estimating, using the enrollment data, values of the parameters representing the linear transformation.

Some embodiments provide for a system for adapting a trained neural network acoustic model using enrollment data comprising speech data corresponding to a plurality of utterances spoken by a speaker. The system comprises at least one computer hardware processor; and at least one non-transitory computer-readable storage medium storing processor-executable instructions that, when executed by the at least one computer hardware processor, cause the at least one computer hardware processor to perform: adapting the trained neural network acoustic model to the speaker to obtain an adapted neural network acoustic model, the adapting comprising: augmenting the trained neural network acoustic model with parameters representing a linear transformation to be applied to a subset of inputs to the adapted neural network acoustic model, the subset of inputs including speaker information values input to the adapted neural network acoustic model; and estimating, using the enrollment data, values of the parameters representing the linear transformation.

Some embodiments provide for a method for adapting a trained neural network acoustic model. The method comprises using at least one computer hardware processor to perform: generating initial speaker information values for a speaker; generating first speech content values from first speech data corresponding to a first utterance spoken by the speaker; processing the first speech content values and the initial speaker information values using the trained neural network acoustic model; recognizing, using automatic speech recognition, the first utterance based, at least in part on results of the processing; generating updated speaker information values using the first speech data and at least one of the initial speaker information values and/or information used to generate the initial speaker information values; and recognizing, based at least in part on the updated speaker information values, a second utterance spoken by the speaker.

Some embodiments provide for at least one non-transitory computer-readable storage medium storing processor-executable instructions that, when executed by at least one computer hardware processor, cause the at least one computer hardware processor to perform a method for adapting a trained neural network acoustic model. The method comprises: generating initial speaker information values for a speaker; generating first speech content values from first speech data corresponding to a first utterance spoken by the speaker; processing the first speech content values and the initial speaker information values using the trained neural network acoustic model; recognizing, using automatic speech recognition, the first utterance based, at least in part on results of the processing; generating updated speaker information values using the first speech data and at least one of the initial speaker information values and/or information used to generate the initial speaker information values; and recognizing, based at least in part on the updated speaker information values, a second utterance spoken by the speaker.

Some embodiments provide for a system for adapting a trained neural network acoustic model. The system comprises at least one computer hardware processor; and at least one non-transitory computer-readable storage medium storing processor-executable instructions that, when executed by the at least one computer hardware processor, cause the at least one computer hardware processor to perform: generating initial speaker information values for a speaker; generating first speech content values from first speech data corresponding to a first utterance spoken by the speaker; processing the first speech content values and the initial speaker information values using the trained neural network acoustic model; recognizing, using automatic speech recognition, the first utterance based, at least in part on results of the processing; generating updated speaker information values using the first speech data and at least one of the initial speaker information values and/or information used to generate the initial speaker information values; and recognizing, based at least in part on the updated speaker information values, a second utterance spoken by the speaker.

The foregoing is a non-limiting summary of the invention, which is defined by the attached claims.

BRIEF DESCRIPTION OF DRAWINGS

Various aspects and embodiments of the application will be described with reference to the following figures. The figures are not necessarily drawn to scale. Items appearing in multiple figures are indicated by the same or a similar reference number in all the figures in which they appear.

DETAILED DESCRIPTION

Figure 1A:
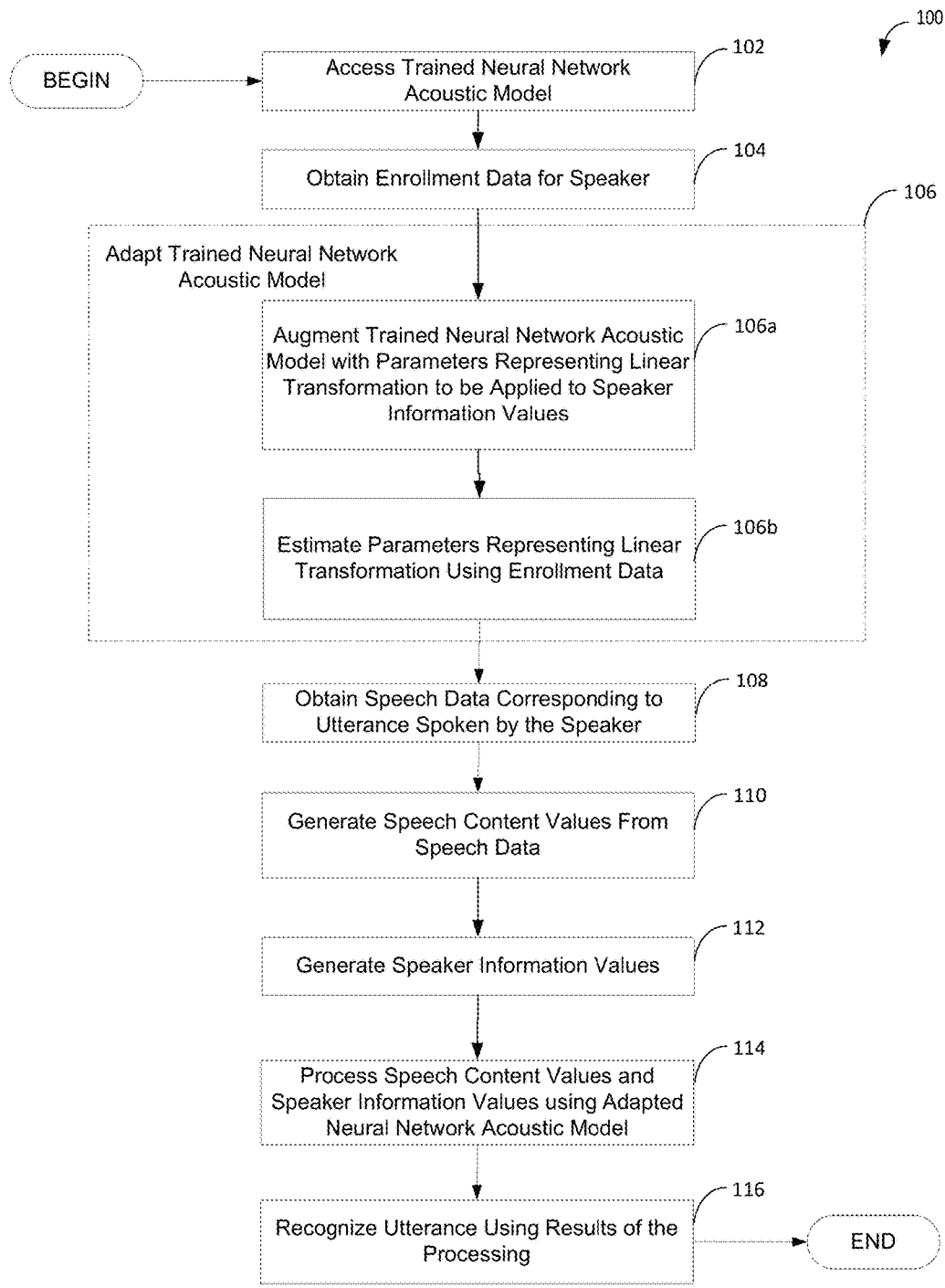
FIG. 1A is a flowchart of an illustrative process for adapting a trained neural network acoustic model to a speaker using enrollment data available for the speaker, in accordance with some embodiments of the technology described herein.

The inventors have recognized and appreciated that conventional techniques for adapting a neural network acoustic model to a speaker require using a large amount of speech data obtained from the speaker. For example, some conventional techniques require using at least ten minutes of speech data from a speaker to adapt a neural network acoustic model to the speaker. On the other hand, in many practical settings, either only a small amount of speech data is available for a speaker (e.g., less than a minute of the speaker's speech) or no speech data for the speaker is available at all. Absence of enrollment data or the availability of only a small amount of enrollment data renders conventional techniques for adapting neural network acoustic models either inapplicable (e.g., when no training data is available) or unusable (e.g., when an insufficient amount of training data is available to perform the adaptation).

Accordingly, some embodiments provide for offline adaptation techniques that may be used to adapt a neural network acoustic model to a speaker using a small amount of enrollment data available for a speaker. For example, the techniques described herein may be used to adapt a neural network acoustic model to a speaker using less than a minute of speech data (e.g., 10-20 seconds of speech data) obtained from the speaker. After the acoustic neural network acoustic model is adapted using enrollment data for a speaker, the adapted acoustic model may be used for recognizing the speaker's speech. Other embodiments provide for online adaptation techniques that may be used to adapt a neural network acoustic model to a speaker without using any enrollment data and while the neural network acoustic model is being used to recognize the speaker's speech.

Some embodiments of the technology described herein address some of the above-discussed drawbacks of conventional techniques for adapting neural network acoustic models. However, not every embodiment addresses every one of these drawbacks, and some embodiments may not address any of them. As such, it should be appreciated that aspects of the technology described herein are not limited to addressing all or any of the above discussed drawbacks of conventional techniques for adapting neural network acoustic models.

Accordingly, in some embodiments, a trained neural network acoustic may be adapted to a speaker using enrollment data comprising speech data corresponding to a plurality of utterances spoken by the speaker. The trained neural network acoustic model may have an input layer, one or more hidden layers, and an output layer, and may be a deep neural network acoustic model. The input layer may include a set of input nodes to which speech content values derived from a speech utterance may be applied and a different set of input nodes to which speaker information values derived from a speech utterance may be applied. Speech content values may include values used to capture information about the content of a spoken utterance including, but not limited to, Mel-frequency cepstral coefficients (MFCCs) for one or multiple speech frames, first-order differences between MFCCs for consecutive speech frames (delta MFCCs), and second-order differences between MFCCs for consecutive frames (delta-delta MFCCs). Speaker information values may include values used to capture information about the speaker of a spoken utterance and, for example, may include a speaker identity vector (i-vector for short). An i-vector for a speaker is a low-dimensional fixed-length representation of a speaker often used in speaker-verification and speaker recognition. Computation of i-vectors is discussed in greater detail below.

In some embodiments, the trained neural network acoustic model may be adapted to a speaker by: (1) augmenting the neural network acoustic model with parameters representing a linear transformation to be applied to speaker information values input to the adapted neural network acoustic model; and (2) estimating the parameters representing the linear transformation by using the enrollment data for the speaker. In some embodiments, the neural network acoustic model may be augmented by inserting a partial layer of nodes between the input layer and the first hidden layer. The partial layer (see e.g., nodes 204 shown in FIG. 2B) may be inserted between the set of input nodes to which speaker information values (e.g., an i-vector) for a speaker may be applied and the first hidden layer. The weights associated with inputs to the inserted partial layer of nodes (see e.g., weights 203 shown in FIG. 2B), which weights are parameters of the adapted neural network acoustic model, represent a linear transformation to be applied to the speaker information values input to the adapted neural network acoustic model. The values of these weights may be estimated using the enrollment data, for example, by using a stochastic gradient descent technique.

It should be appreciated that adapting a trained neural network acoustic model by inserting only a partial layer of nodes, as described herein, may be performed with less enrollment data than would be needed for adaptation that involves inserting a full layer of nodes into the trained neural network acoustic model. This is because augmenting a neural network acoustic model with a partial (rather than a full) layer of nodes results in a smaller number of weights that need to be estimated in the augmented neural network acoustic model. As one non-limiting example, a neural network acoustic model may include 500 input nodes including 400 input nodes to which speech content values are to be applied and 100 input nodes to which speaker information values are to be applied. Inserting a full layer of nodes (500 nodes in this example) between the input layer and the first hidden layer requires subsequent estimation of 500×500=250,000 weights, which requires a substantial amount of enrollment data. By contrast, inserting a partial layer of nodes (100 nodes in this example) between the input layer nodes to which speaker information values are to be applied and the first hidden layer requires subsequent estimation of 10,000 weights, which may be performed with less enrollment data. Accordingly, the inventors' recognition that a trained neural network acoustic model may be adapted through a linear transformation of speaker information values only (and not speaker speech content values) is one of the main reasons for why the adaptation techniques described herein may be used in situations when only a small amount (e.g., 10-60 seconds) of enrollment data is available.

After a trained neural network acoustic model is adapted to a speaker via the above-discussed augmentation and estimation steps, the adapted neural network acoustic model may be used (e.g., as part of an ASR system) to recognize a new utterance spoken by the speaker. To this end, speech content values (e.g., MFCCs) may be generated from speech data corresponding to the new utterance, speaker information values (e.g., an i-vector) for the speaker may be generated (e.g., by using enrollment data used for adaptation and/or speech data corresponding to the new utterance), and the adapted neural network acoustic model may be used to process the speech content values and speaker information values (e.g., to obtain one or more acoustic scores), which processing includes applying the linear transformation (the linear transformation is represented by the parameters that were estimated from the enrollment data during adaptation) to the speaker information values, and recognizing the new utterance based, at least in part, on results of the processing.

In some embodiments, a trained neural network acoustic model may be adapted online as it is being used to recognize a speaker's speech. Although no enrollment data may be available for the speaker, the trained neural network acoustic model may be adapted by iteratively computing an estimate of speaker information values (e.g., an i-vector) for the speaker. Before any speech data from the speaker is obtained, the estimate of the speaker information values for the speaker may be set to an initial set of values. Each time that speech data corresponding to a new utterance is obtained from the speaker, the estimate of the speaker information values may be updated based on the speech data corresponding to the new utterance. In turn, the updated estimate of speaker information values may be used to recognize a subsequent utterance spoken by the speaker. These online adaptation techniques are described in more detail below with reference to FIGS. 3 and 4.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1A is a flowchart of an illustrative process 100 for adapting a trained neural network acoustic model to a speaker using enrollment data available for the speaker, in accordance with some embodiments of the technology described herein. Process 100 may be performed by any suitable computing device(s) and, for example, may be performed by computing device 154 and/or server 158 described below with reference to FIG. 1B.

Process 100 begins at act 102, where a trained neural network acoustic model is accessed. The trained neural network acoustic model may be accessed from any suitable source where it is stored and, for example, may be accessed from at least one non-transitory computer-readable storage medium on which it is stored. The trained neural network acoustic model may be stored on at least one non-transitory computer-readable storage medium in any suitable format, as aspects of the technology described herein are not limited in this respect.

Figure 2A:
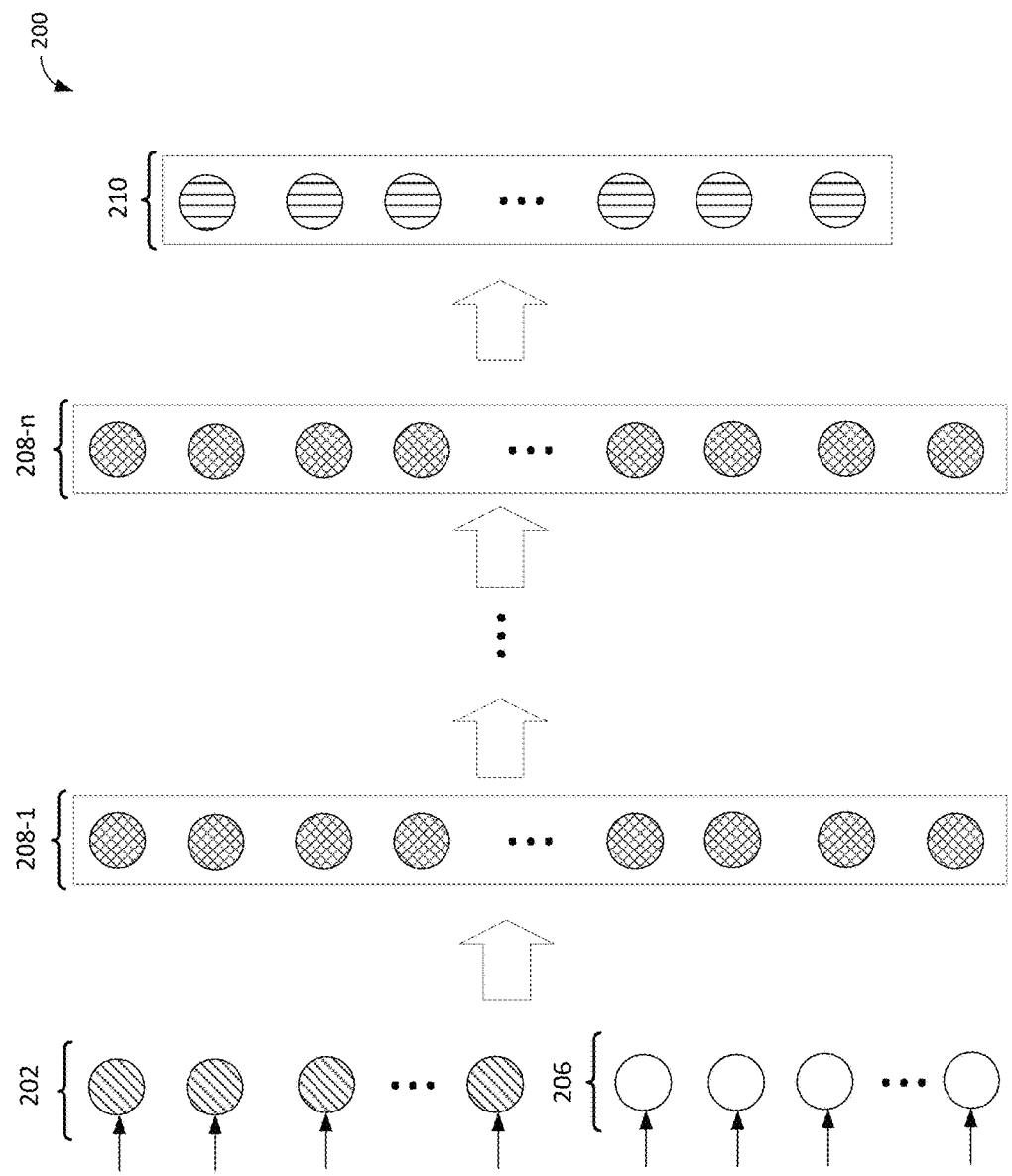
FIG. 2A illustrates a trained neural network acoustic model, in accordance with some embodiments of the technology described herein.

The trained neural network acoustic model may comprise a plurality of layers including an input layer, one or more hidden layers, and an output layer. In some embodiments, the trained neural network acoustic model may be a deep neural network (DNN) acoustic model and may comprise multiple (e.g., two, three, four, five, six, seven, eight, nine, ten, etc.) hidden layers. FIG. 2A shows a non-limiting illustrative example of a trained DNN acoustic model 200. Trained DNN acoustic model 200 includes an input layer comprising a set of input nodes 202 and a set of input nodes 206, hidden layers 208-1 through 208-n (where n is an integer greater than or equal to one that represents the number of hidden layers in DNN acoustic model 200), and output layer 210.

The input layer of the trained neural network acoustic model may include a set of input nodes to which speech content values derived from a speech utterance may be applied and a different set of input nodes to which speaker information values for a speaker may be applied. For example, the input layer DNN acoustic model 200 includes the set of input nodes 206 (no shading) to which speech content values derived from a speech utterance may be applied and the set of input nodes 202 (diagonal shading) to which speaker information values for a speaker may be applied.

In some embodiments, the speech content values may include values used to capture information about the content of a spoken utterance. The speech content values may include a set of speech content values for each of multiple speech frames in a window of consecutive speech frames, which window is sometimes termed a "context" window. The speech content values for a particular speech frame in the context window may include MFCCs, delta MFCCs, delta-delta MFCCs, and/or any other suitable features derived by processing acoustic data in the particular speech frame and other frames in the context window. The number of speech frames in a context window may be any number between ten and twenty, or any other suitable number of speech frames. As one non-limiting example, a context window may include 15 speech frames and 30 MFCCs may be derived by processing speech data in each speech frame such that 450 speech content values may be derived from all the speech data in the context window. Accordingly, in this illustrative example, the set of input nodes in an input layer of an acoustic model to which speech content values are to be applied (e.g., the set of nodes 206 in DNN acoustic model 200) would include 450 nodes.

In some embodiments, the speaker information values may include values used to capture information about the speaker of a spoken utterance. For example, the speaker information values may include an i-vector for the speaker. The i-vector may be normalized. Additionally or alternatively, the i-vector may be quantized (e.g., to one byte or any other suitable number of bits). As one non-limiting example, the speaker information values may include an i-vector having 100 values. Accordingly, in this illustrative example, the set of input nodes in an input layer of an acoustic model to which speaker information values are to be applied (e.g., the set of nodes 202 in DNN acoustic model 200) would include 100 input nodes.

Each of the layers of the trained neural network acoustic model accessed at act 102 may have any suitable number of nodes. For example, as discussed above, the input layer may have hundreds of input nodes (e.g., 400-600 nodes). Each of the hidden layers of the trained neural network acoustic model may have any suitable number of nodes (e.g., at least 1000, at least 1500, at least 2000, between 1000 and 3000) selected based on the desired design of the neural network acoustic model. In some instances, each hidden layer may have 2048 nodes. In some instances, each hidden layer of the neural network acoustic model may have same number of nodes. In other instances, at least two hidden layers of the neural network acoustic model may have a different number of nodes. Each node in the output layer of the neural network acoustic model may correspond to an output state of an HMM such as a context-dependent hidden Markov model (HMM). In some instances, the context-dependent HMM may have thousands of output states (e.g., 8,000-12,000 output states). Accordingly, in some embodiments, the output layer of a trained neural network acoustic model (e.g., output layer 210 of DNN acoustic model 200) has thousands of nodes (e.g., 8,000-12,000 nodes).

After the trained neural network acoustic model is accessed at act 102, process 100 proceeds to act 104, where enrollment data to be used for adapting the trained neural network to a speaker is obtained. The enrollment data comprises speech data corresponding to one or more utterances spoken by the speaker. The speech data may be obtained in any suitable way. For example, the speaker may provide the speech data in response to being prompted to do so by a computing device that the speaker is using (e.g., the speaker's mobile device, such as a mobile smartphone or laptop). To this end, the computing device may prompt the user to utter a predetermined set of one or more utterances that constitute at least a portion of enrollment text. Additionally, the enrollment data may comprise information indicating the content of the utterance(s) spoken by the speaker (e.g., the text of the utterance(s), a sequence of HMM output states corresponding to the utterance(s), etc.).

In some embodiments, a small amount of enrollment data is obtained at act 104. For example, the enrollment data may include no more than a minute (e.g., less than 60 seconds, less than 50 seconds, less than 40 seconds, less than 30 seconds, less than 20 seconds, between 5 and 20 seconds, between 10 and 30 seconds, etc.) of speech data corresponding to one or more utterances spoken by the speaker. However, in other embodiments, the enrollment data obtained at act 104 may include more than a minute of speech data, as aspects of the technology described herein are not limited in this respect.

After the enrollment data for a speaker is obtained at act 104, process 100 proceeds to act 106 where the trained neural network acoustic model accessed at act 102 is adapted to the speaker. The adaptation of act 106 is performed in two stages. First, at act 106a, the trained neural network acoustic model is augmented with parameters representing a linear transformation to be applied to speaker information values that will be input to the adapted neural network acoustic model. Then, at act 106b, the values of the parameters representing the linear transformation are estimated using the enrollment data obtained at act 104.

Figure 2B:
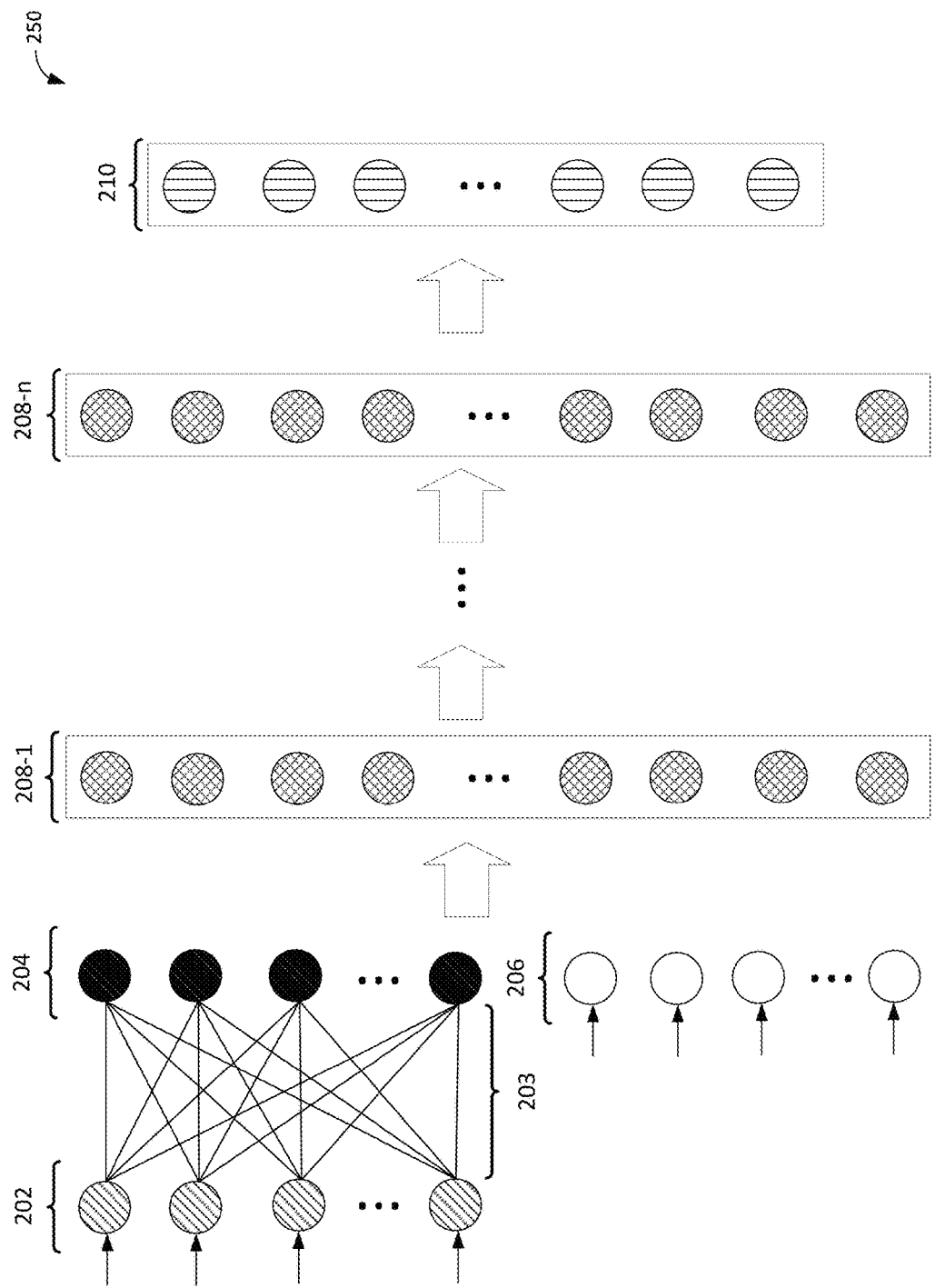
FIG. 2B illustrates an adapted neural network acoustic model, in accordance with some embodiments of the technology described herein.

At act 106a, the trained neural network acoustic model may be augmented with a partial layer of nodes and parameters associated with the partial layer of nodes. The partial layer of nodes may be inserted between the set of nodes in the input layer to which speaker information values are to be applied and the first hidden layer. The parameters associated with the partial layer of nodes include the weights associated with the inputs to the partial layer of nodes. These weights represent a linear transformation to be applied to any speaker information values input to the adapted neural network acoustic model. For example, the trained DNN acoustic model 200 shown in FIG. 2A, may be augmented by inserting a partial layer of nodes 204 (the nodes 204 are highlighted with solid black shading) and weights 203 associated with inputs to the partial layer of nodes 204 to obtain DNN acoustic model 250 shown in FIG. 2B. As shown in FIG. 2B, the partial layer of nodes 204 is inserted between the set of nodes 202 to which speaker information values for a speaker may be applied and the first hidden layer 208-1. The weights 203 are parameters of the DNN acoustic model 250 and represent a linear transformation to be applied to the speaker information values input to the DNN acoustic model 250. Accordingly, when speaker information values are applied as inputs to nodes 202, the speaker information values are transformed using weights 203 to obtain inputs to the partial layer of nodes 204.

Next, at act 106b, the values of the parameters added to the trained neural network acoustic model are estimated using the enrollment data obtained at act 104. In some embodiments, act 106b includes: (1) generating speech content values from the enrollment data; (2) generating speaker information values from the enrollment data; and (3) using the generated speech content values and speaker information values as input to the adapted neural network acoustic model in order to estimate the values of the parameters added at act 106a. The estimation may be done in any suitable supervised learning technique. For example, in some embodiments, the enrollment data may be used to estimate the values of the added parameters using a stochastic gradient descent technique (e.g., a stochastic gradient backpropagation technique), while keeping the values of other parameters of the trained neural network acoustic model fixed. Though, it should be appreciated that the enrollment data may be used to estimate the values of the added parameters in any other suitable way, as aspects of the technology described herein are not limited to using a stochastic gradient descent technique for estimating the values of the added parameters.

After the trained neural network acoustic model is adapted to the speaker, at act 106, process 100 proceeds to acts 108-116, where the adapted neural network acoustic model is used for recognizing a new utterance spoken by the speaker.

After speech data corresponding to a new utterance spoken by the speaker is obtained at act 108, process 100 proceeds to act 110, where speech content values are generated from the speech data obtained at act 108. The speech content values may be obtained by any suitable front-end processing technique(s). In some embodiments, for example, the speech data obtained at act 108 may be divided into speech frames, and the speech frames may be grouped into overlapping sets of consecutive speech frames called context windows. Each such context window may include 10-20 speech frames. Speech content values may be generated for each context window from speech data in the context window and may include, for example, any of the types of speech content values described above including, but not limited to, MFCCs, delta MFCCs, and delta-delta MFCCs. As a specific non-limiting example, speech content values generated for a context window may include MFCCs derived from speech data in each speech frame in the context window. The MFCCs for each speech frame in the context window may be concatenated to form a vector of speech content values that may be input to the adapted neural network acoustic model as part of performing speech recognition on the new utterance. For example, the vector of speech content values may be applied as input to nodes 206 of adapted neural network 250 shown in FIG. 2B.

Next, process 100 proceeds to act 112, where speaker information values for the speaker are generated. In some embodiments, the speaker information values may be obtained from the enrollment data for the speaker obtained at act 104. In other embodiments, the speaker information values may be obtained from the enrollment data obtained at act 104 and the speech data corresponding to the new utterance obtained at act 108. In such embodiments, the enrollment data may be used to generate an initial set of speaker information values, and this initial set of speaker information values may be updated based on the speech data obtained at act 108.

As discussed above, in some embodiments, the speaker information values may include an identity or i-vector for a speaker. Described below are some illustrative techniques for generating an i-vector for a speaker from speaker data. The speaker data may include enrollment data obtained at act 104 and/or speech data obtained at act 108.

In some embodiments, an i-vector for a speaker may be generated using the speaker data together with a so-called universal background model (UBM), and projection matrices estimated for the UBM. The universal background model and the projection matrices may be estimated using the training data that was used to train the neural network acoustic model accessed at act 102. The universal background model and the projection matrices may be estimated by using an expectation maximization (EM) technique, a principal components analysis (PCA) technique, and/or in any other suitable way, as aspects of the technology described herein is not limited in this respect.

The universal background model is a generative statistical model for the acoustic feature vectors $x_t \in R^D$. That is, the acoustic feature vectors $x_t \in R^D$ may be viewed as samples generated from the UBM. In some embodiments, the UBM may comprise a Gaussian mixture model having K Gaussian components, and the acoustic the acoustic feature vectors $x_t \in R^D$ may be viewed as samples generated from the Gaussian mixture model according to:

$$x_t \sim \Sigma_{k=1}^{K} c_k N(.; \mu_k(0), \Sigma_k),$$

where $c_k$ is the weight of the $k^{th}$ Gaussian in the GMM, $\mu_k(0)$ is the speaker-independent mean of the $k^{th}$ Gaussian in GMM, and $\Sigma_k$ is the diagonal covariance of the $k^{th}$ Gaussian in the GMM. Assuming that the acoustic data $x_t(s)$ belonging to speaker s are drawn from Gaussian mixture model given by:

$$x_t \sim \Sigma_{k=1}^{K} c_k N(.; \mu_k(s), \Sigma_k),$$

where $\mu_k(s)$ are the means of the GMM adapted to speaker s, the algorithm for generating an i-vector for speaker s is based on the idea that there is a linear dependence between the speaker-adapted means $\mu_k(s)$ and the speaker-independent means $\mu_k(0)$ of the form:

$$\mu_k(s) = \mu_k(0) + T_k w(s), \; k=1 \ldots K$$

where $T_k$ is a D×M matrix, called the i-vector projection matrix, and w(s) is the speaker identity vector (i-vector) corresponding to speaker s. Each projection matrix $T_k$ contains M bases which span the subspace with important variability in the component mean vector space.

Given the universal background model (i.e., the weights $c_k$, the speaker-independent means $\mu_k(0)$, and covariances $\Sigma_k$ for $1 \leq k \leq K$), the projection matrices $T_k$ for $1 \leq k \leq K$, and speaker data $x_t(s)$ for speaker s (which, as discussed above may include speech data for speaker s obtained at act 104 and/or at act 108), an i-vector w(s) for speaker s can be estimated according to the following formulas.

$$w(s) = L^{-1}(s)\Sigma_{k=1}^{K} T_k^T \Sigma_k^{-1} \theta_k(s) = L^{-1}(s)\Sigma_{k=1}^{K} P_k^T \Sigma_k^{-1/2} \theta_k(s) \quad (1)$$

$$L(s) = I + \Sigma_{k=1}^{K} \gamma_k(s) T_k^T \Sigma_k^{-1} T_k = I + \Sigma_{k=1}^{K} \gamma_k(s) P_k^T P_K \quad (2)$$

$$P_k = E_k^{-1/2} T_k \quad (3)$$

$$\gamma_k(s) = \Sigma_t \gamma_{tk}(s) \quad (4)$$

$$\theta_k(s) = \Sigma_t \gamma_{tk}(s)(x_t(s) - \mu k(0)) \quad (5)$$

where $\gamma_{tk}(s)$ is the posterior probability of the $k^{th}$ mixture component in the universal background GMM given the speaker data $x_t(s)$. Accordingly, the quantities $\gamma_k(s)$ and $\theta_k(s)$ may be considered as the zero-order and centered first-order statistics accumulated from speaker data $x_t(s)$. The quantity $L^{-1}(s)$ is the posterior covariance of the i-vector w(s) given speaker data $x_t(s)$.

In some embodiments, as an alternative approach to generating an i-vector for speaker s according to the Equations (1)-(5), the i-vector may be calculated using a principal components analysis approach. In this approach, the projection matrices $T_k$ may be estimated by applying principal components analysis to the super vector $\hat{\theta}(s)$ defined according to:

$$\hat{\theta}(s) = [\hat{\theta}_1(s), \hat{\theta}_2(s), \ldots, \hat{\theta}_K(s)], \text{ where}$$

$$\hat{\theta}_k(s) = \gamma_k^{-1/2} \Sigma_k^{-1/2} \theta_k(s), k=1 \ldots K$$

Let the KD×M matrix $P=[P_1; P_2; \ldots; P_K]$ contain the first M principal components, obtained by applying principal components analysis to the super vector $\hat{\theta}(s)$, where P is a KD×M matrix. Then an i-vector for speaker s may be estimated according to:

$$w(s) = P^T \hat{\theta}(s) = \Sigma_{k=1}^K \gamma_k^{1/2} P_k^T \Sigma_k^{1/2} \theta_k(s). \quad (6)$$

This PCA-based approach to calculating an i-vector reduces the computational complexity of calculating an i-vector from $O(KDM+KM^2+M^3)$, which is the complexity of generating an i-vector according to Equations (1)-(5), down to $O(KDM)$.

Accordingly, at act 112 of process 100, an i-vector for a speaker may be generated from speaker data by using one of the above-described techniques for generating an i-vector. For example, in some embodiments, Equations (1)-(5) or (6) may be applied to speech data obtained at act 104 only to generate an i-vector for the speaker. In other embodiments, Equations (1)-(5) or (6) may be applied to speech data obtained at act 104 and at act 108 to generate an i-vector for the speaker. In such embodiments, the speech data obtained at act 104 as part of the enrollment data may be used to estimate an initial i-vector, and the initial i-vector may be updated by using the speech data obtained at act 108. For example, speech data obtained at act 108 may be used to update the quantities $\gamma_k(s)$ and $\theta_k(s)$, which quantities were initially computed using the enrollment data, and the updated quantities may be used to generate the updated i-vector according to Equations (1)-(3).

As discussed above, in some embodiments, an i-vector may be normalized. For example, in some embodiments an i-vector w(s) may be normalized according to $$\frac{w(s)}{\|w(s)\|}.$$

Additionally or alternatively, in some embodiments, an i-vector may be quantized. For example, each element in the i-vector may be quantized to one byte (or any other suitable number of bits). The quantization may be performed using any suitable quantization technique, as aspects of the technology described herein are not limited in this respect.

After speaker information values are generated at act 112, process 100 proceeds to act 114, where the speech content values and the speaker information values are applied as inputs to the adapted neural network acoustic model. When speech content values are available for each of multiple context windows, speech content values for each context window are applied together with the speaker information values as inputs to the adapted neural network model. The adapted neural network acoustic model processes these inputs by mapping the inputs to HMM output states (e.g., to output states of a context-dependent HMM part of an ASR system). The adapted neural network acoustic model processes the inputs at least in part by applying the linear transformation estimated at act 106 to the speaker information values. The adapted neural network acoustic model may process the inputs to obtain one or more acoustic scores (e.g., an acoustic score for each of one or more HMM output states). As one non-limiting example, speech content values generated at act 110 may be applied as inputs to nodes 206 of adapted deep neural network 250 and speaker information values generated at act 112 may be applied as inputs to nodes 202 of adapted DNN 250. The adapted DNN 250 processes the inputted values at least in part by applying the linear transformation represented by weights 203 to the speaker information values inputted to nodes 202.

Next, results of the processing performed at act 114 may be used to recognize the new utterance spoken by the speaker at act 116. This may be done in any suitable way. For example, results of the processing may be combined with one or more other models (e.g., one or more language models, one or more prosody models, one or more pronunciation models, and/or any other suitable model(s)) used in automatic speech recognition to produce a recognition result.

It should be appreciated that process 100 is illustrative and that there are variations of process 100. For example, although in the illustrated embodiment, speaker information values are calculated after the speech content values are calculated, in other embodiments, the speaker information value may be calculated at any time after the enrollment data are obtained. As another example, in some embodiments, process 100 may include training the unadapted neural network acoustic model rather than only accessing the trained neural network acoustic model at act 102.

Figure 1B:
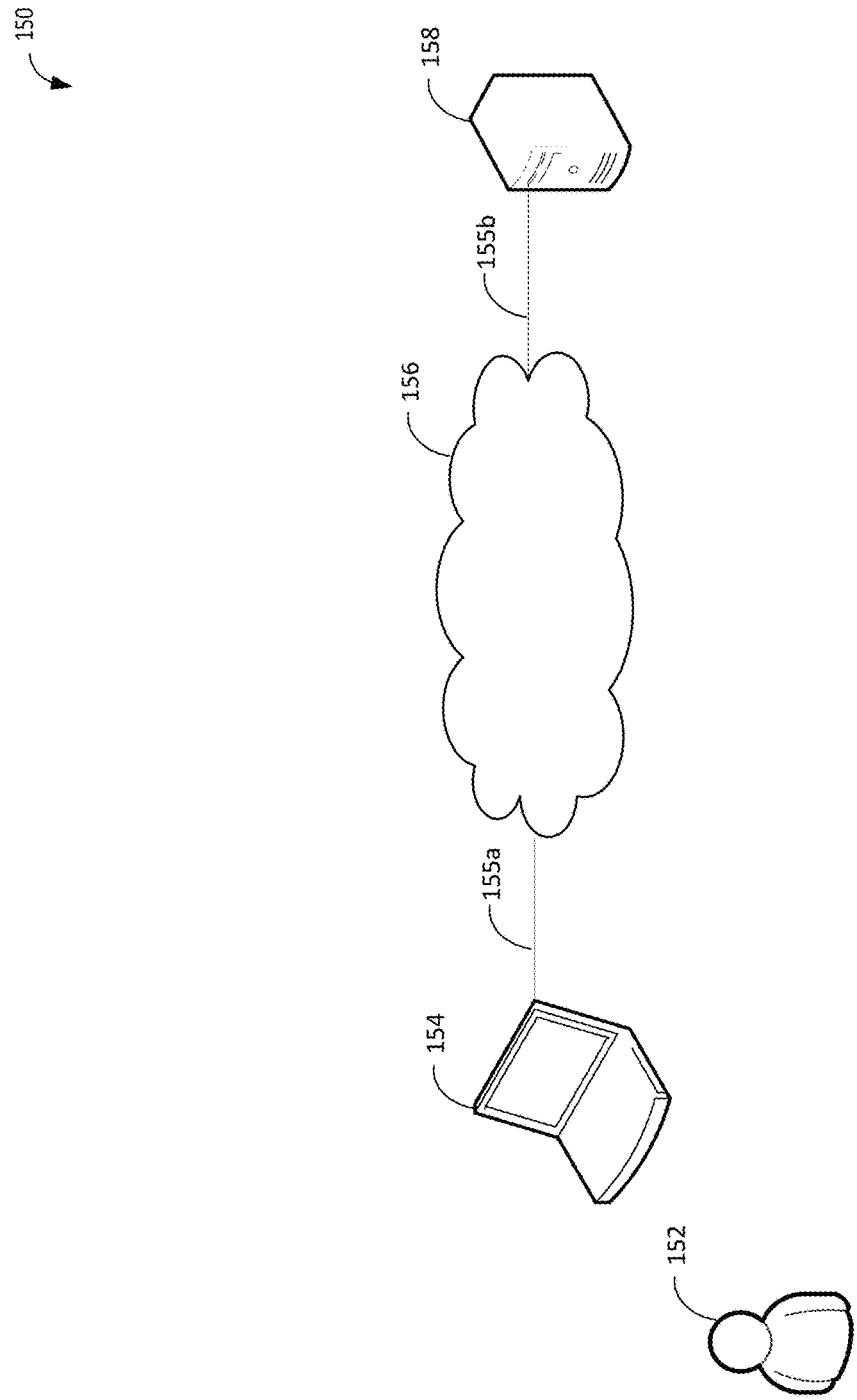
FIG. 1B is a diagram of an illustrative environment in which embodiments of the technology described herein may operate.

FIG. 1B is a diagram of an illustrative environment 150 in which embodiments of the technology described herein may operate. In the illustrative environment 150, speaker 152 may provide input to computing device 154 by speaking, and one or more computing devices in the environment 150 may recognize the speaker's speech at least in part by using the process 100 described above. In some embodiments, the computing device 154 alone may perform process 100 locally in order to adapt a trained neural network acoustic model to the speaker 152 and recognize the speaker's speech at least in part by using the adapted neural network acoustic model. In other embodiments, the server 158 alone may perform process 100 remotely in order to adapt a trained neural network acoustic model to the speaker 152 and recognize the speaker's speech at least in part by using the adapted neural network acoustic model. In still other embodiments, the process 100 may be performed at least in part locally by computing device 154 and at least in part remotely by server 158.

In some embodiments, the computing device 154 alone may perform process 100. For example, the computing device 154 may access a trained neural network acoustic model, obtain enrollment data for speaker 152, adapt the trained neural network acoustic model to speaker 152 using the enrollment data via the adaptation techniques described herein, and recognize the speaker's speech using the adapted neural network acoustic model. Computing device 154 may access the trained neural network acoustic model from server 158, from at least one non-transitory computer readable storage medium coupled to computing device 154, or any other suitable source. Computing device 154 may obtain enrollment data for speaker 152 by collecting it from speaker 152 directly (e.g., by prompting speaker 152 to speak one or more enrollment utterances), by accessing the enrollment data from another source (e.g., server 158), and/or in any other suitable way.

In other embodiments, the server 158 alone may perform process 100. For example, the server 158 may access a trained neural network acoustic model, obtain enrollment data for speaker 152, adapt the trained neural network acoustic model to speaker 152 using the enrollment data via the adaptation techniques described herein, and recognize the speaker's speech using the adapted neural network acoustic model. Computing device 154 may access the trained neural network acoustic model from at least one non-transitory computer readable storage medium coupled to server 158 or any other suitable source. Server 158 may obtain enrollment data for speaker 152 from computing device 154 and/or any other suitable source.

In other embodiments, computing device 154 and server 158 may each perform one or more acts of process 100. For example, in some embodiments, computing device 154 may obtain enrollment data from the speaker (e.g., by prompting the speaker to speak one or more enrollment utterances) and send the enrollment data to server 158. In turn, server 158 may access a trained neural network acoustic model, adapt it to speaker 152 by using the enrollment data via the adaptation techniques described herein, and send the adapted neural network acoustic model to computing device 154. In turn, computing device 154 may use the adapted neural network acoustic model to recognize any new speech data provided by speaker 152. Process 100 may be distributed across computing device 154 and server 158 (and/or any other suitable devices) in any other suitable way, as aspects of the technology described herein are not limited in this respect.

Each of computing devices 154 and server 158 may be a portable computing device (e.g., a laptop, a smart phone, a PDA, a tablet device, etc.), a fixed computing device (e.g., a desktop, a rack-mounted computing device) and/or any other suitable computing device. Network 156 may be a local area network, a wide area network, a corporate Intranet, the Internet, any/or any other suitable type of network. In the illustrated embodiment, computing device 154 is communicatively coupled to network 156 via a wired connection 155a, and server 158 is communicatively coupled to network 156 via wired connection 155b. This is merely for illustration, as computing device 154 and server 158 each may be communicatively coupled to network 156 in any suitable way including wired and/or wireless connections.

It should be appreciated that aspects of the technology described herein are not limited to operating in the illustrative environment 150 shown in FIG. 1B. For example, aspects of the technology described herein may be used as part of any environment in which neural network acoustic models may be used.

Figure 3:
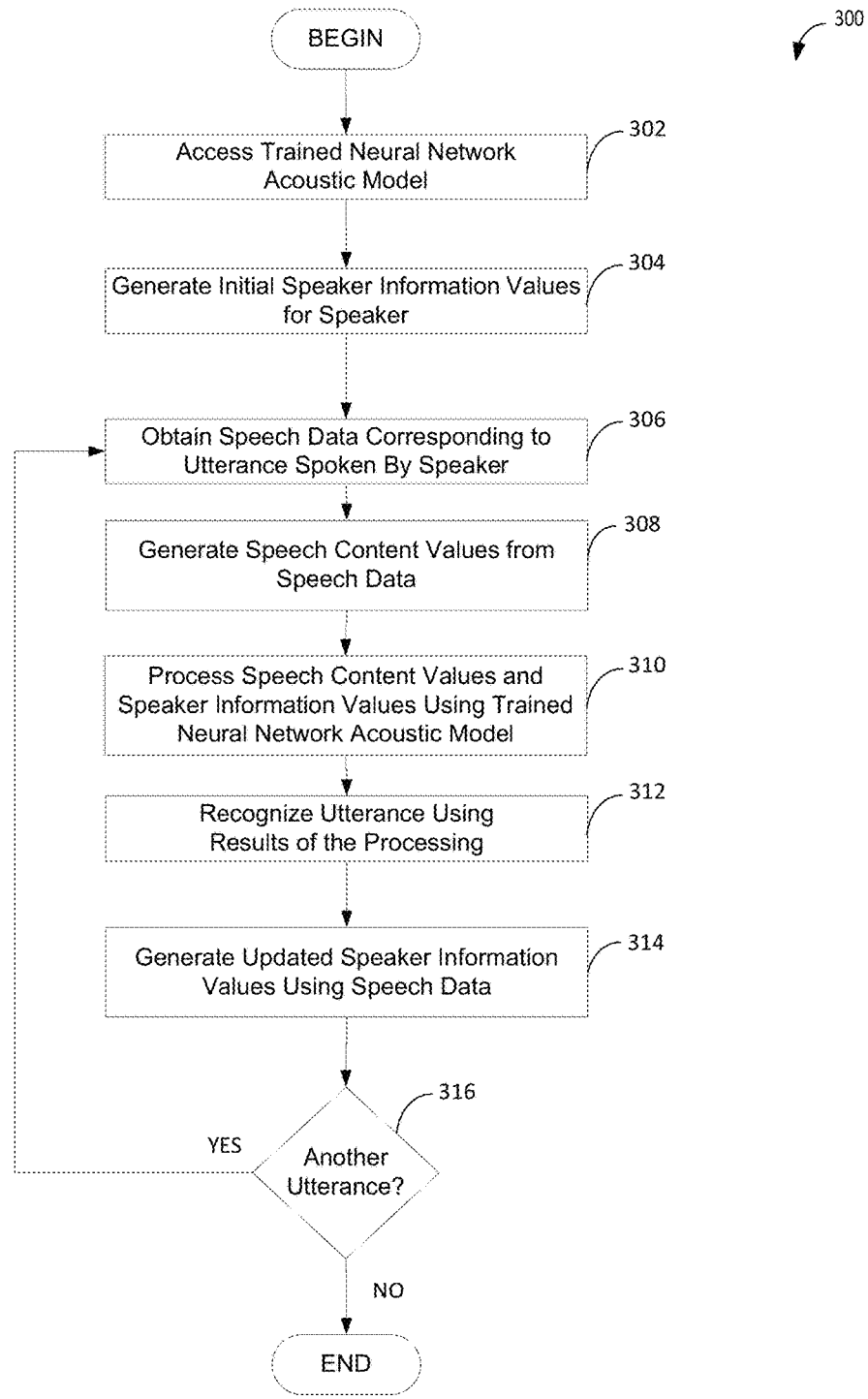
FIG. 3 is a flowchart of an illustrative process for online adaptation of a trained neural network acoustic model, in accordance with some embodiments of the technology described herein.

As discussed above, it may be desirable to adapt a trained neural network acoustic model to a speaker even in a situation where no enrollment data for the speaker is available. Accordingly, in some embodiments, a trained neural network acoustic model may be adapted to a speaker— online—as it is being used to recognize the speaker's speech. The trained neural network acoustic model is not modified in this case. However, as more speech data is obtained from the speaker, these speech data may be used to construct and iteratively update an estimate of the speaker's identity vector (i-vector). The updated i-vector may be provided as input to the trained acoustic model to achieve improved recognition performance. FIG. 3 is a flowchart of an illustrative process 300 for online adaptation of a trained neural network acoustic model to a speaker, in accordance with some embodiments of the technology described herein.

Process 300 may be performed by any device(s) and, for example, may be performed by computing device 154 and/or server 158 described with reference to FIG. 1B. For example, in some embodiments, process 300 may be performed by computing device 154 alone, by server 158 alone, or at least in part by computing device 154 and at least in part by server 158. It should be appreciated, however, that process 300 is not limited to being performed in illustrative environment 150 and may be used as part of any environment in which neural network acoustic models may be used.

Process 300 begins at act 302, where a trained neural network acoustic model is accessed. The trained neural network acoustic model may be accessed in any suitable way including any of the ways described above with reference to act 102 of process 100. The trained neural network acoustic model may be of any suitable type and, for example, may be any of the types of trained neural network acoustic models described herein. For example, the trained neural network acoustic model may comprise a plurality of layers including an input layer, one or more hidden layers, and an output layer. In some embodiments, the trained neural network acoustic model may be a deep neural network (DNN) acoustic model and may comprise multiple (e.g., two, three, four, five, six, seven, eight, nine, ten, etc.) hidden layers. The input layer may comprise a set of input nodes to which speech content values derived from a speech utterance may be applied and a different set of input nodes to which speaker information values (e.g., an i-vector) for a speaker may be applied. One non-limiting example of such a trained neural network acoustic model is provided in FIG. 2A.

After the trained neural network acoustic model is accessed at act 302, process 300 proceeds to act 304, where an initial set of speaker information values is generated for the speaker. Generating an initial set of speaker information values may comprise generating an initial i-vector for the speaker, which may be done in any suitable way. For example, in embodiments where no speech data for the speaker is available, the i-vector may be initialized by assigning the same value to each coordinate of the i-vector (a so-called "flat start" initialization). For example, the i-vector may be initialized to a normalized unit vector having a desired dimensionality M such that each coordinate is initialized to the value $1/\sqrt{M}$. In this case, the quantities $\gamma_k(s)$ and $\theta_k(s)$ may be initialized to zero. As another example, in embodiments where some speech data for the speaker is available, the i-vector may be initialized from the available speech data, for example, by computing the quantities, $\gamma_k(s)$ and $\theta_k(S)$ from the available speech data and using these quantities to generate an initial i-vector by using Equations (1)-(3) described above.

Next process 300 proceeds to act 306, where speech data corresponding to a new utterance spoken by the speaker is obtained. Next, process 300 proceeds to act 308, where speech content values are generated from the speech data. The speech content values may be generated in any suitable way including in any of the ways described with reference to act 110 of process 100. For example, the speech data obtained at act 306 may be divided into speech frames, and the speech frames may be grouped into context windows each including 10-20 speech frames. Speech content values may be generated for each context window from speech data in the context window and may include, for example, any of the types of speech content values described above including, but not limited to, MFCCs, delta MFCCs, and delta-delta MFCCs. As a specific non-limiting example, speech content values generated for a context window may include MFCCs derived from speech data in each speech frame in the context window. The MFCCs for each speech frame in the context window may be concatenated to form a vector of speech content values that may be input to the trained neural network acoustic model as part of performing speech recognition on the new utterance. For example, the vector of speech content values may be applied as input to nodes 206 of trained neural network 200 shown in FIG. 2A.

After the speech content values are generated at act 308, process 300 proceeds to act 310, where the speech content values generated at act 308 and the initial speaker information values generated at act 304 are applied as inputs to the trained neural network acoustic model accessed at act 302. When speech content values are available for each of multiple context windows, speech content values for each context window are applied together with the speaker information values as inputs to the trained neural network model. The trained neural network acoustic model processes these inputs by mapping the inputs to HMM output states (e.g., to output states of a context-dependent HMM part of an ASR system). For example, the trained neural network acoustic model processes these inputs to obtain one or more acoustic scores (e.g., an acoustic score for each of the output states of an HMM). As one non-limiting example, speech content values generated at act 308 may be applied as inputs to nodes 206 of trained DNN 200 and speaker information values generated at act 304 may be applied as inputs to nodes 202 of trained DNN 200.

Next, results of the processing performed at act 312 may be used to recognize the new utterance spoken by the speaker at act 314. This may be done in any suitable way. For example, results of the processing may be combined with one or more other models (e.g., one or more language models, one or more prosody models, one or more pronunciation models, and/or any other suitable model(s)) used in automatic speech recognition to produce a recognition result.

Next, process 300 proceeds to act 314, where the initial speaker information values computed at act 304 are updated using the speech data obtained at act 306 to generate updated speaker information values that will be used to recognize a subsequent utterance spoken by the speaker. In some embodiments, updating the speaker information values using the speech data comprises updating an i-vector for the speaker by using the speech data. This may be done using the techniques described below or in any other suitable way.

In some embodiments, information used to compute the initial i-vector and the speech data may be used to generate an updated i-vector for the speaker. For example, in some embodiments, the quantities $\gamma_k(s)$ and $\theta_k(s)$ may be used to compute the initial i-vector and the speech data obtained at act 306 may be used to update these quantities. In turn, the updated quantities $\gamma_k(s)$ and $\theta_k(s)$ may be used to calculate an updated i-vector via Equations (1)-(3) described above. The updated i-vector may be normalized (e.g., length normalized) and quantized (e.g., to a byte or any other suitable number of bits). As described above, when enrollment data is available, the quantities $\gamma_k(s)$ and $\theta_k(s)$ may be initialized from the enrollment data. When no enrollment data is available, the quantities $\gamma_k(s)$ and $\theta_k(s)$ may be initialized to zero. This technique may be termed the "statistics carry-over" technique since the statistical quantities $\gamma_k(s)$ and $\theta_k(s)$ are being updated.

In other embodiments, the initial i-vector and the speech data may be used to generate the updated i-vector for the speaker. For example, in some embodiments, the frame count $N(s) = \sum_{k=1}^{K} \gamma_k(s)$ and the un-normalized initial i-vector $w_i(s)$ may be combined with an i-vector $w_c(s)$ obtained from the speech data obtained at act 306 (the "current" speech data) to generate an updated i-vector $w_u(s)$. For example, the updated i-vector $w_u(s)$ may be generated according to:

$$w_u(s) = \frac{N(s) * w_i(s) + n_c(s) * w_c(s)}{N(s) + n_c(s)}$$

$$N(s) = N(s) + n_c(s)$$

where $n_c(s)$ is the frame count for the speech data obtained at act 306. The updated i-vector $w_u(s)$ may be normalized (e.g., length normalized) and quantized (e.g., to one byte or any other suitable number of bits). The initial values for $N(s)$ and $w_i(s)$ may be computed from enrollment data, when it is available. However, when no enrollment data is available, the frame count $N(s)$ may be initialized to zero and $w_i(s)$ may be initialized with a flat start, as described above with reference to act 304.

Next process 300 proceeds to decision block 316, where it is determined whether there is another utterance by the speaker to be recognized. This determination may be made in any suitable way, as aspects of the technology described herein are not limited in this respect. When it is determined that there is no other utterance by the speaker to be recognized, process 300 completes. On the other hand, when it is determined that there is another utterance by the speaker to be recognized, process 300 returns via the YES branch to act 306 and acts 306-314 are repeated. In this way, the updated speaker information values for the speaker (e.g., the updated i-vector for the speaker) generated at act 314 may be used to recognize the other utterance. It should be appreciated that the most up-to-date speaker information values available are used as inputs to the trained neural network acoustic model at act 310. Thus, after process 300 returns to act 306, the updated speaker information values generated at act 314 are used as inputs to the trained neural network acoustic model at act 310.

Furthermore, the updated speaker information values generated at act 314 may be further updated based on speech data obtained from the other utterance. For example, the initial i-vector and the speech data for the first utterance may be used to generate an updated i-vector used for recognizing a second utterance. If the speaker provides a second utterance, then the initial i-vector, the speech data for the first and second utterances may be used to generate an i-vector used for used for recognizing a third utterance. If the speaker provides a third utterance, then the initial i-vector, the speech data for the first, second, and third utterances may be used to generate an i-vector used for recognizing a fourth utterance. And so on. This iterative updating is described further below with reference to FIG. 4.

It should be appreciated that process 300 is illustrative and that there are variations of process 300. For example, in some embodiments, process 300 may include training the unadapted neural network acoustic model rather than only accessing the trained neural network acoustic model at act 302. As another example, in the illustrated embodiment, speaker information values updated based on speech data from a particular utterance are used to recognize the next utterance spoken by the speaker, but are not used to recognize the particular utterance itself because doing so would introduce a latency in the recognition, which may be undesirable in speech recognition applications where real-time response is important (e.g., when a user is using his/her mobile device to perform a voice search). In other embodiments, however, speaker information values updated based on speech data from a particular utterance may be used to recognize the particular utterance itself. This may be practical in certain applications such as transcription (e.g., transcription of dictation by doctors to place into medical records, transcription of voice-mail into text, etc.). In such embodiments, act 314 may be performed before act 310 so that the updated speaker information values may be used as inputs to the trained neural network acoustic model during the processing performed at act 310.

Figure 4:
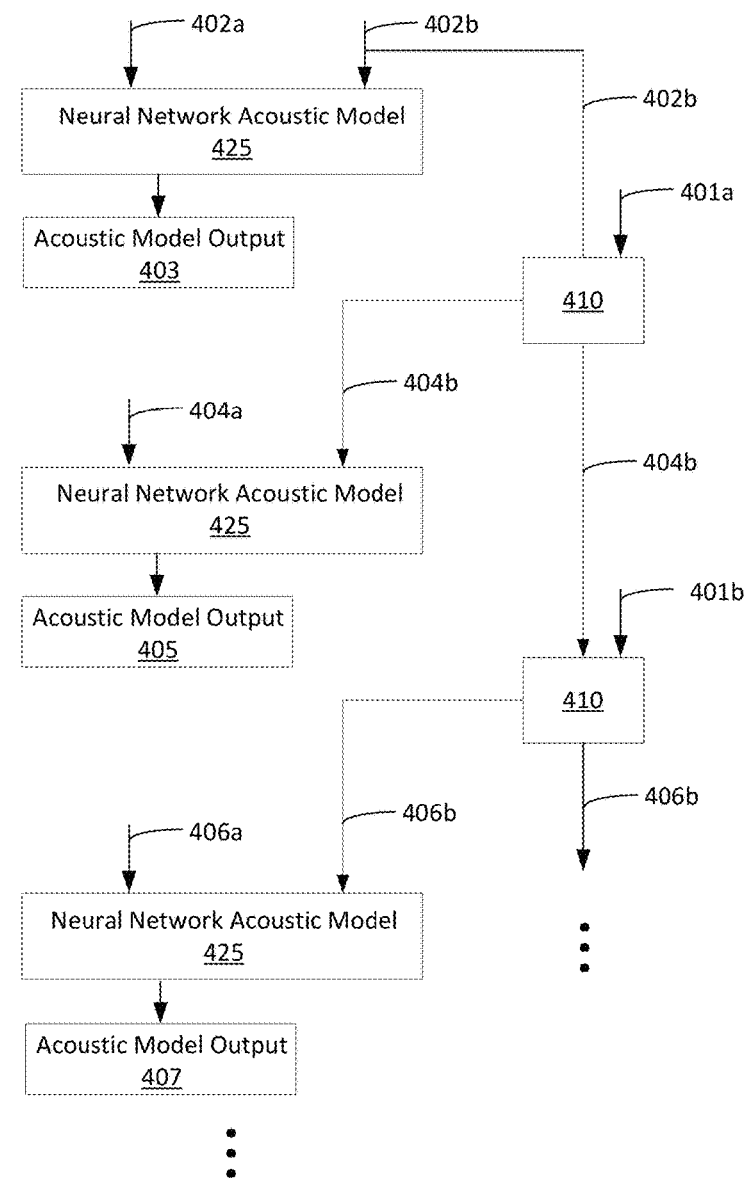
FIG. 4 is a diagram illustrating online adaptation of a trained neural network acoustic model, in accordance with some embodiments of the technology described herein.

FIG. 4 is a diagram illustrating online adaptation of a trained neural network acoustic model, in accordance with some embodiments of the technology described herein. In particular, FIG. 4 highlights the iterative updating, through two iterations of process 300, of a speaker identity vector for the speaker to which the trained neural network model is being adapted.

In the example illustrated in FIG. 4, before any speech data is obtained from a speaker, a trained neural network acoustic model 425 is accessed and an initial i-vector 402*b* for the speaker is generated (e.g., using the flat start initialization described above). After first speech data 401*a* corresponding to a first utterance by the speaker is obtained, speech content values 402*a* are generated from the first speech data 401*a*. The speech content values 402*a* and the initial i-vector 402*b* are applied to neural network acoustic model 425 to generate acoustic model output 403. Next, an updated i-vector 404*b* is generated, at block 410, based on the initial i-vector 402*b* and the first speech data 401*a*. Block 410 represents logic used for generating an updated i-vector from a previous i-vector and speech data corresponding to the current speech utterance.

Next, after second speech data 401*b* corresponding to a second utterance by the speaker is obtained, speech content values 404*a* are generated from the second speech data 401*b*. The speech content values 404*a* and updated i-vector 404*b* are applied to neural network acoustic model 425 to generate acoustic model output 405. Next, an updated i-vector 406*b* is generated, at block 410, based on the i-vector 404*b* and the second speech data 401*b*.

Next, after third speech data corresponding to a third utterance by the speaker is obtained, speech content values 406*a* are generated from the third speech data. The speech content values 406*a* and i-vector 406*b* are applied to neural network acoustic model 425 to generate acoustic model output 407. The third speech data may then be used to update the i-vector 406*b* to generate an updated i-vector that may be used to recognize a subsequent utterance, and so on.

Figure 5:
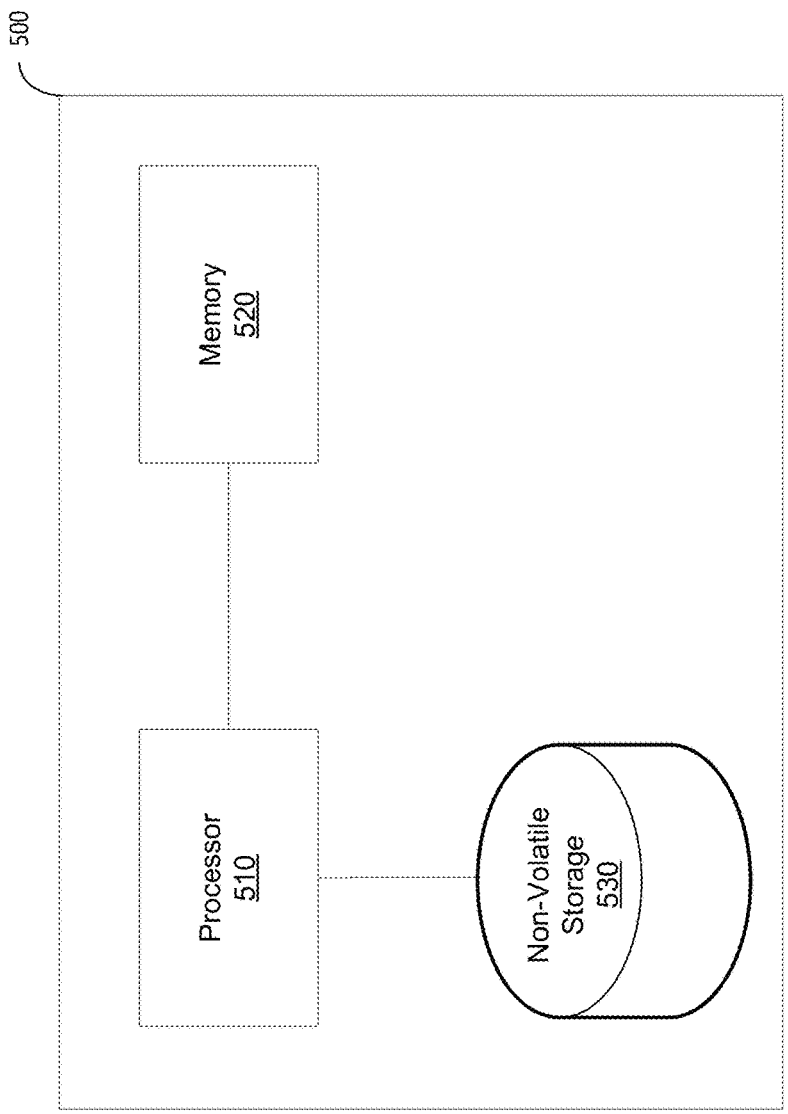
FIG. 5 is a diagram of an illustrative computer system that may be used in implementing some embodiments of the technology described herein.

An illustrative implementation of a computer system 500 that may be used in connection with any of the embodiments of the disclosure provided herein is shown in FIG. 5. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes 100 and 300 described with reference to FIGS. 1 and 3) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for adapting a trained neural network acoustic model, the method comprising:
   using at least one computer hardware processor to perform:
      generating speaker information values for a speaker;
      generating speech content values from speech data corresponding to an utterance spoken by the speaker;
      processing the speech content values and the speaker information values using the trained neural network acoustic model, the trained neural network acoustic model comprising a neural network and the processing comprising inputting the speaker information values to a partial layer of nodes of the neural network that is positioned in the neural network before a hidden layer of nodes of the neural network, the partial layer of nodes being configured to apply a transformation to the speaker information values based on parameters with which the partial layer of nodes are configured; and
      generating updated parameters for the partial layer of nodes based on the processing.

2. The method of claim 1, further comprising using the at least one computer hardware processor to perform:
   generating second speech content values from second speech data corresponding to a second utterance spoken by the speaker; and
   processing the second speech content values and the speaker information values using the trained neural network acoustic model and the updated parameters for the partial layer of nodes.

3. The method of claim 1, wherein generating the speaker information values comprises generating an i-vector for the speaker.

4. The method of claim 3, wherein generating the i-vector for the speaker comprises generating a normalized and quantized i-vector for the speaker.

5. The method of claim 1, wherein the neural network comprises at least three layers.

6. At least one non-transitory computer-readable storage medium storing processor-executable instructions that, when executed by at least one computer hardware processor, cause the at least one computer hardware processor to perform a method for adapting a trained neural network acoustic model, the method comprising:
   generating speaker information values for a speaker based, at least in part, on statistics from speech data;
   generating speech content values from speech data corresponding to an utterance spoken by the speaker;
   processing the speech content values and the speaker information values using the trained neural network acoustic model, the trained neural network acoustic model comprising a neural network and the processing comprising inputting the speaker information values to a partial layer of nodes of the neural network that is positioned in the neural network before a hidden layer of nodes of the neural network, the partial layer of nodes being configured to apply a transformation to the speaker information values based on parameters with which the partial layer of nodes are configured; and
   generating updated parameters for the partial layer of nodes based on the processing.

7. The at least one non-transitory computer-readable storage medium of claim 6, where the method further comprises:
   generating second speech content values from second speech data corresponding to a second utterance spoken by the speaker; and
   processing the second speech content values and the speaker information values using the trained neural network acoustic model and the updated parameters for the partial layer of nodes.

8. The method of claim 6, wherein generating the speaker information values comprises generating an i-vector for the speaker.

9. The method of claim 8, wherein generating the i-vector for the speaker comprises generating a normalized and quantized i-vector for the speaker.

10. A system for adapting a trained neural network acoustic model, comprising:
    at least one computer hardware processor; and
    at least one non-transitory computer-readable storage medium storing processor-executable instructions that, when executed by the at least one computer hardware processor, cause the at least one computer hardware processor to perform:
       generating speaker information values for a speaker based, at least in part, on statistics from speech data;
       generating speech content values from speech data corresponding to an utterance spoken by the speaker;
       processing the speech content values and the speaker information values using the trained neural network acoustic model, the trained neural network acoustic model comprising a neural network and the processing comprising inputting the speaker information values to a partial layer of nodes of the neural network that is positioned in the neural network before a hidden layer of nodes of the neural network, the partial layer of nodes being configured to apply a transformation to the speaker information values based on parameters with which the partial layer of nodes are configured; and generating updated parameters for the partial layer of nodes based on the processing.

11. The system of claim 10, further comprising using the at least one computer hardware processor to perform:

generating second speech content values from second speech data corresponding to a second utterance spoken by the speaker; and processing the second speech content values and the speaker information values using the trained neural network acoustic model and the updated parameters for the partial layer of nodes.

12. The system of claim 10, wherein generating the speaker information values comprises generating an i-vector for the speaker.

13. The system of claim 12, wherein generating the i-vector for the speaker comprises generating a normalized and quantized i-vector for the speaker.

14. The system of claim 10, wherein the neural network comprises at least three layers.

\* \* \* \* \*